United States Patent
Hann et al.

(10) Patent No.: US 7,680,416 B2
(45) Date of Patent: Mar. 16, 2010

(54) WDM-PON HAVING OPTICAL SOURCE OF SELF-INJECTION LOCKED FABRY-PEROT LASER DIODE

(75) Inventors: Swook Hann, Kwangju (KR); Chang Soo Park, Daejeon (KR)

(73) Assignee: Kwangju Institute of Science and Technology, Kwangju (KR)

( * ) Notice: Subject to any disclaimer, the term of this patent is extended or adjusted under 35 U.S.C. 154(b) by 926 days.

(21) Appl. No.: 11/024,830

(22) Filed: Dec. 30, 2004

(65) Prior Publication Data

US 2006/0083515 A1  Apr. 20, 2006

(30) Foreign Application Priority Data

Oct. 20, 2004  (KR)  ........................ 10-2004-0083983

(51) Int. Cl.
*H01S 3/092* (2006.01)
*G02B 6/26* (2006.01)

(52) U.S. Cl. .............................. 398/85; 398/86; 398/87; 398/66; 398/67; 398/70; 398/71; 398/72

(58) Field of Classification Search ............... 398/66, 398/68, 70–72, 67
See application file for complete search history.

(56) References Cited

U.S. PATENT DOCUMENTS

| | | | | |
|---|---|---|---|---|
| 5,504,606 A | * | 4/1996 | Frigo | 398/58 |
| 5,550,666 A | * | 8/1996 | Zirngibl | 398/72 |
| 5,694,234 A | * | 12/1997 | Darcie et al. | 398/72 |
| 5,760,940 A | * | 6/1998 | Frigo | 398/38 |
| 5,790,293 A | * | 8/1998 | Frigo | 398/33 |
| 5,818,986 A | * | 10/1998 | Asawa et al. | 385/24 |
| 6,229,938 B1 | * | 5/2001 | Hibino et al. | 385/24 |
| 6,266,460 B1 | * | 7/2001 | Doerr | 385/16 |
| 6,434,175 B1 | * | 8/2002 | Zah | 372/20 |
| 6,512,865 B1 | * | 1/2003 | Shen et al. | 385/24 |
| 6,591,034 B1 | * | 7/2003 | Albrecht et al. | 385/24 |
| 6,597,482 B1 | * | 7/2003 | Chung et al. | 398/87 |
| 6,674,929 B2 | * | 1/2004 | Feng et al. | 385/15 |
| 6,697,414 B1 | * | 2/2004 | Kato et al. | 372/102 |

(Continued)

FOREIGN PATENT DOCUMENTS

KR  2003-0085385  11/2003

(Continued)

OTHER PUBLICATIONS

Swook Hann et. al.; *Bi-directional transmission using a self-tuned Fabry-Perot laser diode at the subscriber in WDM-PON*; ECOC 2004 Proceedings, vol. 3; 99. 756-757.

(Continued)

*Primary Examiner*—Ken N Vanderpuye
*Assistant Examiner*—Danny W Leung

(57) ABSTRACT

A wavelength division multiplexed-passive optical network includes an optical line terminal for generating downstream optical signals of discrete wavelengths and for receiving upstream optical signals of discrete wavelengths, a remote node, coupled to the optical line terminal, a wavelength division unit settled to reflect a predetermined wavelength, and a plurality of optical network units. Each optical network unit has an optical source which is oscillated in a multi-mode and is self-injection locked by the predetermined wavelength provided thereto, thereby to generate the upstream optical signal in a single mode to be provided to the remote node.

10 Claims, 7 Drawing Sheets

U.S. PATENT DOCUMENTS

| | | | |
|---|---|---|---|
| 6,721,506 B1* | 4/2004 | Lam | 398/70 |
| 6,751,372 B2* | 6/2004 | Feuer et al. | 385/24 |
| 6,996,138 B2* | 2/2006 | Jung et al. | 372/18 |
| 7,054,519 B1* | 5/2006 | Novotny | 385/16 |
| 7,085,499 B2* | 8/2006 | Yap et al. | 398/183 |
| 7,167,649 B2* | 1/2007 | Song et al. | 398/72 |
| 7,203,422 B2* | 4/2007 | Kani et al. | 398/72 |
| 7,254,340 B2* | 8/2007 | Jung et al. | 398/95 |
| 7,295,778 B2* | 11/2007 | Lee et al. | 398/72 |
| 7,327,957 B2* | 2/2008 | Lee et al. | 398/82 |
| 7,340,177 B2* | 3/2008 | Kwon et al. | 398/95 |
| 7,349,631 B2* | 3/2008 | Lee et al. | 398/82 |
| 7,515,626 B2* | 4/2009 | Lee et al. | 372/71 |
| 2001/0012426 A1* | 8/2001 | Kato | 385/37 |
| 2002/0061168 A1* | 5/2002 | Farjady et al. | 385/37 |
| 2002/0089717 A1* | 7/2002 | Boroditsky et al. | 359/119 |
| 2003/0090767 A1* | 5/2003 | Yap et al. | 359/181 |
| 2004/0101305 A1* | 5/2004 | Jung et al. | 398/71 |
| 2004/0208564 A1* | 10/2004 | Helbing et al. | 398/77 |
| 2004/0213574 A1* | 10/2004 | Han et al. | 398/71 |
| 2005/0036787 A1* | 2/2005 | Lee et al. | 398/72 |
| 2005/0123300 A1* | 6/2005 | Kim et al. | 398/84 |
| 2005/0226620 A1* | 10/2005 | Feuer et al. | 398/83 |
| 2006/0051103 A1* | 3/2006 | Ranganath | 398/183 |
| 2006/0083515 A1* | 4/2006 | Hann et al. | 398/87 |
| 2006/0104638 A1* | 5/2006 | Chung et al. | 398/71 |
| 2006/0126693 A1* | 6/2006 | Kwon et al. | 372/50.1 |
| 2006/0127006 A1* | 6/2006 | Kwon et al. | 385/37 |
| 2007/0091941 A1* | 4/2007 | Mori et al. | 372/18 |
| 2007/0153839 A1* | 7/2007 | Varming et al. | 372/6 |
| 2007/0165688 A1* | 7/2007 | Lee et al. | 372/71 |
| 2008/0279557 A1* | 11/2008 | Park et al. | 398/79 |

FOREIGN PATENT DOCUMENTS

KR    10-2004-0013405    2/2004

OTHER PUBLICATIONS

Swook Hann et. al.; *Uni-lambda bidirectional 10/1.25 GbE access service based on WDM-PON*; Electronics Letters; Feb. 5, 2004; vol. 40, No. 3; 2 pp.

Randy Giles et. al.; *Fiber-Grating Sensor for Wavelength Tracking in Single-Fiber WDM Access PON's*; IEEE Photonics Technology Letters; Apr. 1997; vol. 9, No. 4; pp. 523-525.

* cited by examiner

WDM-PON HAVING OPTICAL SOURCE OF SELF-INJECTION LOCKED FABRY-PEROT LASER DIODE

FIELD OF THE INVENTION

The present invention relates to a wavelength division multiplexed-passive optical subscriber network; and, more particularly, a wavelength division multiplexed-passive optical subscriber network capable of tuning wavelengths of optical signals, which vary with an ambient temperature, to a pass wavelength of remote node.

BACKGROUND OF THE INVENTION

Wavelength-division multiplexing communication systems are widely applied to communication networks such as a trunk system to deal with increasing network traffic due to rapid growth of the Internet. In the wavelength-division multiplexing communication system, a plurality of optical signals of different wavelengths from each other is simultaneously transmitted on a single optical fiber.

Moreover, a wavelength-division multiplexed-passive optical subscriber network (hereinafter, referred to as a WDM-PON) is characterized in that bi-directional symmetrical service and excellent security are guaranteed since optical signals of discrete wavelengths, e.g., upstream optical signals of about 1.3 μm band (1260~1360 nm) and downstream optical signals of about 1.55 μm band (1480~1580 nm) are transmitted between an optical line terminal (hereinafter, referred to as an OLT) or central office (CO) and each optical network unit (hereinafter, referred to as an ONU)

FIG. 1 shows a schematic diagram of an exemplary WDM-PON of a prior art. As shown in FIG. 1, the WDM-PON includes an OLT a 10, an RN 20, an ONU 30 and a single optical fiber 15 for transmitting upstream and downstream signals between the OLT 10 and the ONU 30.

The OLT 10 includes a plurality set of an optical source 11 and a variable optical attenuators/polarization controller. (VOA/PC) 12 and a multiplexer (MUX) 14. The optical sources 11 are made up of laser diodes, e.g., $LD_1$, $LD_2$, ..., $LD_{16}$, which oscillate discrete wavelengths $\lambda_1, \lambda_2, ..., \lambda_{16}$, respectively, and generate optical signals by modulating the discrete wavelengths. The multiplexer 14 multiplexes the optical signals of discrete wavelengths to route the multiplexed optical signals to the optical fiber 15. The variable optical attenuators/polarization controllers 12 are disposed between the optical sources 11 and the multiplexer 14 to perform a function of uniformly adjusting each power of the optical signals before loading the optical signals of different wavelengths on the optical fiber 15.

The RN 20 has a demultiplexer (DEMUX) 20, embedded as a waveguide grating router, for separating the multiplexed optical signals from the OLT 10 via the optical fiber 15 by each discrete wavelength.

The ONU 30 includes a plurality set of a variable optical attenuator/polarization controller (VOA/PC) 32, a band pass filter (BPF) 34 and an optical receiver 36. The optical receivers 36 are made up of photo diodes $PD_1$, $PD_2$ ... $PD_{16}$, respectively, each detecting an optical signal separated by the demultiplexer 20. The variable optical attenuators/polarization controllers 32 are disposed between the demultiplexer 20 and the photo detectors 36 to adjust the powers of optical signals transmitted from the OLT 10, respectively. The band pass filters 24 adjust the optical signals pursuant to a data rate.

The WDM-PON further includes optical amplifiers (OAs) 16 and 19 for compensating losses caused when transmitting the optical signals between the multiplexer 14 and the demultiplexer 20 via the optical fiber 15, and a dispersion compensation fiber (DCF) 18 for compensating color dispersions of the optical signals, accumulated during a long distance transmission.

In the WDM-PON, for downstream transmission of the optical signals, the optical signals of discrete wavelengths are generated in the respective optical sources 11. The downstream optical signals pass their respective corresponding variable optical attenuators/polarization controllers 12 to be routed to the multiplexer 14. The multiplexer 14 multiplexes the downstream optical signals and routes the multiplexed optical signals to the RN 20 via the optical fiber 15. At this time, optical losses and color dispersions of the multiplexed optical signals are compensated through the optical amplifiers 16, 19 and the dispersion compensation fiber 18.

The demultiplexer 20 in the RN 20 separates the multiplexed optical signals by each discrete wavelength and routes the separated optical signals to the ONU (ONU). In the ONU, the downstream optical signals are detected through the corresponding optical receivers 36 ($PD_1$, $PD_2$ ... $PD_{16}$) via the variable optical attenuators/polarization controllers 32 and the band pass filters 34, respectively.

On the other hand, upstream transmission is opposite to the aforementioned downstream transmission and is easily known by those skilled in the art. Therefore, the detailed description thereof is omitted for the sake of simplicity of the description.

In the WDM-PON as described above, in order to transmit the upstream and downstream optical signals between the OLT and the ONUs, crosstalk between adjacent channels has to be large; an optical power of optical signal has to be large; a line width is small; and influence on color dispersion has to be small. Thus, a high-priced, high power and broad band optical source such as a light emitting diode (LED), a super luminescent diode and so forth should be used for overcoming a loss by a distance from the OLT to the ONUS.

Recently, there has been research on a wavelength division low-priced optical source, which employs a Fabry-Perot laser diode. However, the Fabry-Perot laser diode has drawbacks in that a mode hopping and a mode partition are appeared and a wavelength displacement depending on a temperature variation is large. In order to overcome these drawbacks, there has been research on a wavelength locked Fabry-Perot laser diode by a non-interfered light. However, a high-priced broad band optical source having a higher power has to be additionally installed in the OLT, and a plurality of circulators has to be needed.

A distributed feedback laser diode is now employed as a wavelength division optical source for an optical communication of a high speed and a high power, which satisfies the above-mentioned requisites. This distributed feedback laser diode is adequate for a high speed and long-distance signal transmission resulting from a narrow line width, but it is high-priced. Thus, in case of applying the distributed feedback laser diode to a PON, it is needed to equip a plurality of the distributed feedback laser diodes corresponding to different wavelengths from each other assigned to the ONUs. As a result, cost of the PON is increased. Therefore, it is necessary to furnish a low-cost optical source.

Further, in the WOM-PON, the waveguide grating router for splitting optical signals by discrete wavelengths has to be provided with an additional device, which carries out remotely monitoring of the fluctuation of a pass wavelength depending on a temperature variation in the remote node One of methods monitoring a temperature variation of the waveguide grating router in the above-described WDM-PON is disclosed in the paper of S. Hann, D. H. Kim and C. S. Park, "Uni-lambda bidirection 10/1.25 GbE access service based on WDM-PON", Electron. Lett., Vol. 40. No. 3, pp 194-195, 5 Feb. 2004. In addition, there is the paper of R. Giles, S. Jiang, "Fiber-grating sensor for wavelength tracking in single-fiber WDM access PONs", IEEE Photon. Technol. Lett., vol 9, pp 523-525, April, 1997.

Furthermore, a lot of researches on the waveguide grating router unrelated to a temperature variation has been done. However, a lot of cost is required in manufacturing the waveguide grating router, and there remains the problem to be solved yet.

Therefore, there is a need to provide a WDM-PON tuned to a variation of a pass band wavelength depending on a temperature variation of the waveguide grating router while using a low-priced optical source without a temperature monitoring.

SUMMARY OF THE INVENTION

It is, therefore, a primary object of the present invention to provide a WDM-PON capable of tuning wavelengths of optical signals to pass band wavelengths of a waveguide grating router in the WDM-PON without a temperature monitoring.

It is, therefore, another object of the present invention to provide an optical source for use in a WDM-PON being tuned to a variation of the passive band wavelength of the waveguide grating router in the WDM-PON.

In accordance one aspect of the present invention, there is provided a wavelength division multiplexed-passive optical network comprising:

an optical line terminal for generating downstream optical signals of discrete wavelengths and for receiving upstream optical signals of discrete wavelengths;

a remote node, coupled to the optical line terminal via a first optical fiber, including a wavelength division unit settled to reflect a predetermined wavelength; and a plurality of optical network units, wherein each optical network unit is coupled to the remote node via a second optical fiber, and wherein each optical network unit has an optical source which is oscillated in a multi-mode and is self-injection locked by the predetermined wavelength reflected thereto, thereby to generate the upstream optical signal in a single mode to be provided to the remote node via a third optical fiber.

In accordance with another aspect of the present invention, there is further provided a wavelength division optical source for use in a wavelength division multiplexed-passive optical subscriber network, comprising:

an optical source oscillating in a multi-mode and being self-injection locked by a predetermined wavelength, to thereby oscillate a wavelength tuned to the predetermined wavelength in a single mode; and a wavelength selective optical filter for selectively reflecting the predetermined wavelength among a multiplicity of wavelengths oscillated by the optical source to be fed back to the optical source.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENT

A preferred embodiment of the present invention will now be described in more detail with reference to the accompanying drawings in order for those skilled in the art to easily carry out it.

Figure 1:
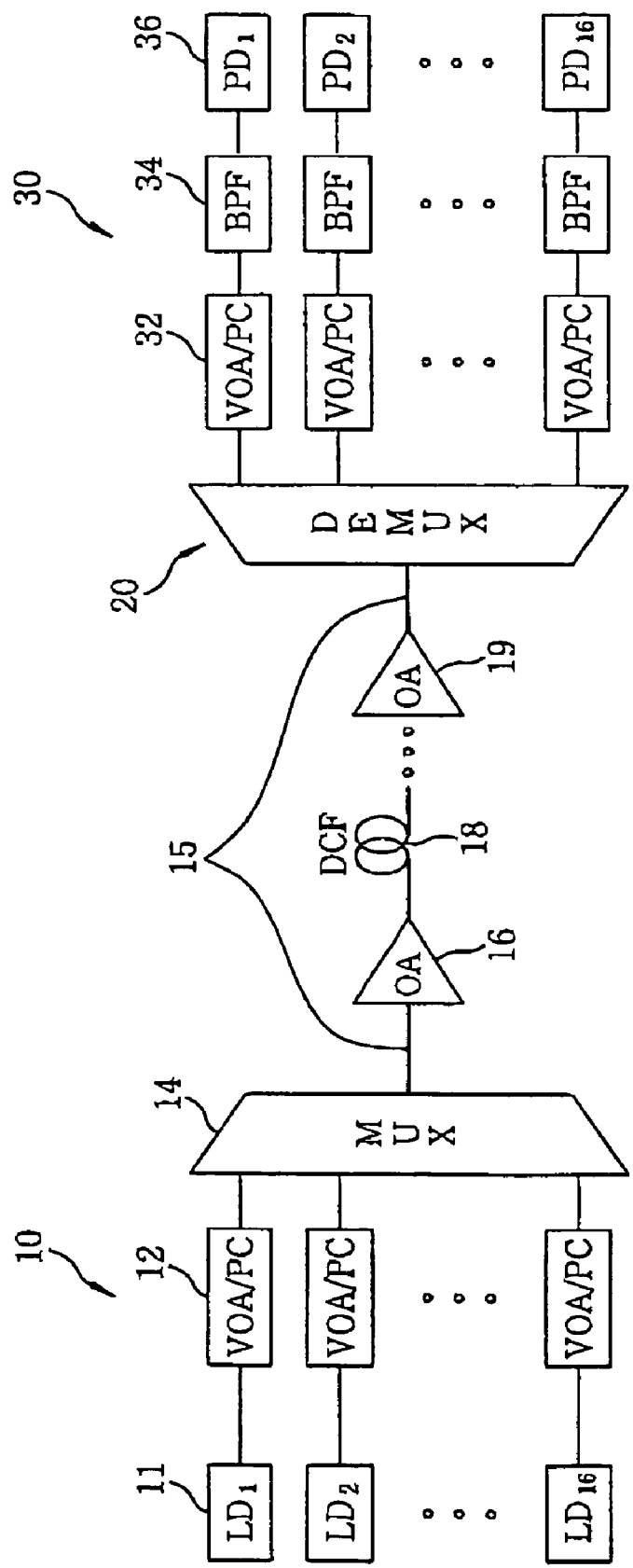
FIG. 1 is a block diagram of a wavelength division multiplexed optical network (WDM) according to a prior art.
Figure 2:
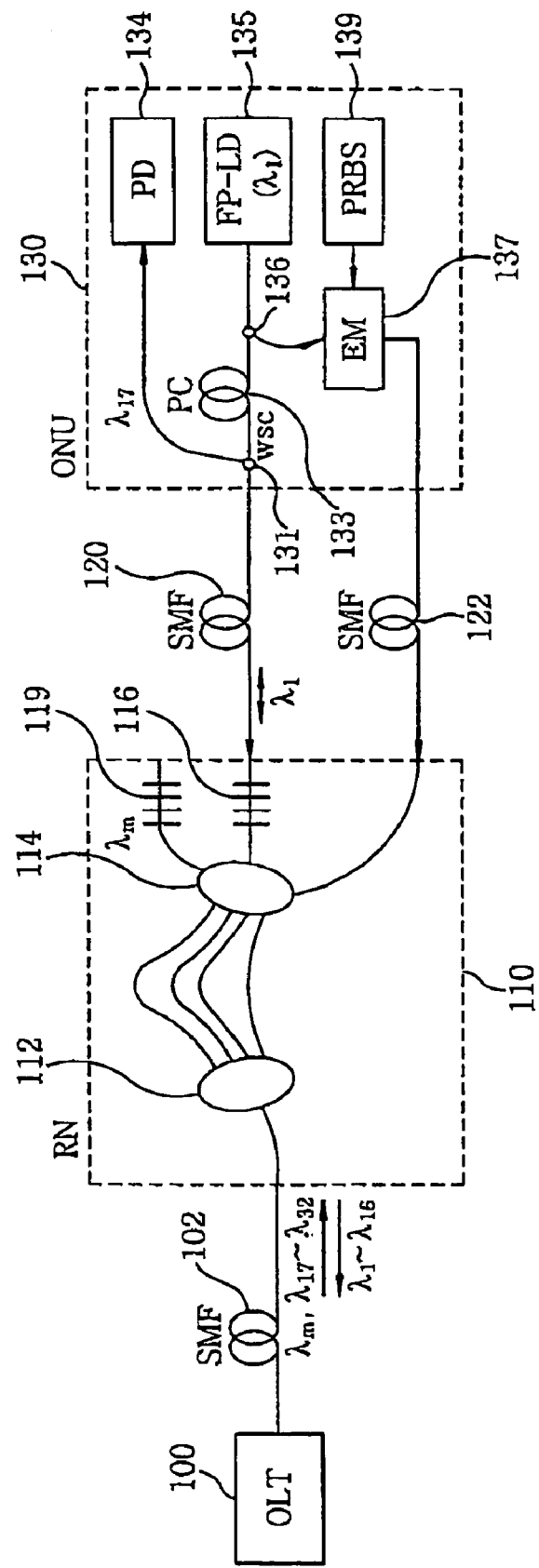
FIG. 2 is a block diagram of a wavelength division multiplexed-passive optical subscriber network (WDM-PON) employing a self-injection locked Fabry-Perot laser diode, in accordance with a preferred embodiment of the present invention.

FIG. 2 is a block diagram of a wavelength division multiplexed-passive optical subscriber network (WDM-PON), in accordance with a first preferred embodiment of the present invention.

As shown in FIG. 2, the WDM-PON of the present invention includes an OLT or central office (CO) 100, a remote node (RN) 110, an optical network unit (ONU) 130. Further, connected between the respective base stations (from the OLT to the RN and from the RN to the ONU) are single mode optical fibers 102, 120 and 122 for transmitting upstream and downstream optical signals. The OLT 100 includes a plurality of optical sources (not shown), and provides optical signals of different wavelengths from each other for transmitting downstream optical signals to the RN 110 and for receiving upstream optical signals from the ONU 130.

The RN 110 includes a wavelength grating router, which functions to splits wavelengths. Though, in the present specification and drawings, there is shown and described the waveguide grating router composed of a first waveguide grating router 112 connected to the OLT 100 and a second waveguide grating router 114 coupled to an ONU 130, it should be understood that this is just for functionally explaining functions of multiplexing and demultiplexing thereof, and that the actual waveguide grating router is composed of a single component. Coupled to the second waveguide grating router 114 is a Bragg grating (BG) 116 which reflects back optical signals of predetermined wavelength band among optical signals of wavelengths provided from the ONU 130. The Bragg grating 116 and the waveguide grating routers 112 and 114 are made of an identical material, e.g., a silica material. Such a Bragg grating 116 can be directly inscribed in the waveguide grating routers 112 and 114 by using a laser and a semiconductor etching method to be integrally formed as one unit.

The ONU 130 includes a Fabry-Perot laser diode 135, a wavelength selective coupler (WSC) 131, a polarization controller (PC) 133, an optical power coupler 136 and an external modulator 137. In the ONU 130, the Fabry-Perot laser diode 135 becomes self-injection locked by the optical signal of wavelength reflected in the Bragg grating 116 of the RN 110. The wavelength selective coupler 131 splits the downstream optical signal to route it to a photo detector (PD) 134. The polarization controller 133 increases efficiencies of the optical signal received in the Fabry-Perot laser diode 135, and the optical power coupler 136 splits the self-injection locked optical power in the Fabry-Perot laser diode 135 into the external modulator 137. The external modulator 137 modulates the wavelength locked by the self optical source, which is split by the optical power coupler 136, with a pseudo-random binary sequence (PRBS) 139.

In accordance with the present invention, the Fabry-Perot laser diode 135 oscillates in a multimode in case an energy of equal to or more than a threshold current is introduced thereto, wherein a predetermined wavelength band among a multiplicity of wavelengths oscillated from the Fabry-Perot laser diode 135 is reflected by the Bragg grating 116 of the waveguide grating router 114 in the RN 110 to feedback to the Fabry-Perot laser diode 135 again. The Fabry-Perot laser diode 135 becomes a self-injection locked by the predetermined wavelength by changing the energy on the basis of the predetermined wavelength of feedbacked optical signal thereto. The self-injection locked Fabry-Perot laser diode 135 shows a similar spectrum as a single mode laser diode, and in the spectrum, the drift in the center wavelength, due to temperature variation, of the waveguide grating routers 112 and 114 in the RN 110 is reflected. Accordingly, in case where a temperature variation exists in the RN 110, the pass band wavelengths of the waveguide grating routers 112 and 114 vary accordingly, and by being tuned to the variation thereof, the central wavelength of the Bragg grating 116 also fluctuates together therewith. As a result, the wavelength oscillated from the self-injection locked Fabry-Perot laser diode 135 by the optical signals reflected by the Bragg grating 116 is also tuned to be identical to the central wavelength of the Bragg grating 116.

In operation, for upstream transmission of optical signals in the WDM-PON of the present invention, wavelengths (for example, $\lambda_1 \sim \lambda_{16}$) of multiple channel signals are oscillated from the Fabry-Perot laser diode 135 in the ONU 130, and the multiple channel signal of wavelengths ($\lambda_1 \sim \lambda_{16}$) are transmitted to the RN 110 through the single mode optical fiber 120. The Bragg grating 116 in the RN 110 reflects back an optical signal of a predetermined wavelength band, e.g., $\lambda_1$, among the multiple wavelengths ($\lambda_1 \sim \lambda_{16}$). The reflected optical signal is fed back to the ONU 130 via the single mode optical fiber 120. The optical signal of wavelength $\lambda_1$ is input into the Fabry-Perot laser diode 135, and, thus, the Fabry-Ferot laser diode 135 is self-injection locked by the optical power of the wavelength $\lambda_1$ tuned on the central wavelength of the Bragg grating 116 at the RN 110. Such a self-injection locked Fabry-Perot laser diode 135 generates an output spectrum similar to a single mode laser diode and oscillates with the wavelength $\lambda_1$ tuned on the central wavelength of the Bragg grating 116. The modulator 137 modulates the wavelength $\lambda_1$ oscillated in the Fabry-Perot laser diode 135, to which the pseudo-random binary sequence 139 serving as an actual imaginary combination signal is added, into an upstream optical signal. The modulated upstream optical signal is transmitted to the RN 110 via the upstream channel optical fiber 122. The upstream optical signal transmitted to the RN 110 passes the waveguide grating routers 112 and 114 to be transmitted to the OLT 100 via the optical fiber 102.

Meanwhile, when transmitting the downstream optical signals from the OLT 100 to the ONU 130 in the WDM-PON, the wavelengths of the downstream optical signals should be controlled to be identical to the pass band wavelengths of the waveguide grating routers 112 and 114. This can be achieved by monitoring an external temperature variation in the RN 110. In accordance with the present invention, the configuration for monitoring temperature variation includes a Bragg grating 119 coupled to the second waveguide grating router 114 in the RN 110. The Bragg grating 119, similarly to the Bragg grating 116, is made of a silica material identical with the waveguide grating routers 112 and 114, and can be integrally formed in the second waveguide grating router 114 as one unit. Further, a wavelength for monitoring the temperature variation in the waveguide grating routers 112 and 114 is selected as a predetermined wavelength, e.g., $\lambda_m$, other than $\lambda_{17} \sim \lambda_{32}$ of the downstream optical signals.

The Bragg grating 119 serves as a wavelength selective optical filter which selectively reflects the optical signal of the monitoring wavelength $\lambda_m$ oscillated in the OLT 100 back to the OLT 100. In case where the temperature at the RN 110 is changed, a central wavelength of the Bragg grating 119 is also changed accordingly together with the pass band wavelength of the waveguide grating routers 112 and 114. For this reason, the monitoring wavelength $\lambda_m$ is tuned to the changed pass band wavelength of the waveguide grating router 112 and 114. Therefore, information on the temperature variation of the waveguide grating routers 112 and 114 and the fluctuation of the pass band wavelength depending on the temperature variation are reflected in the wavelength $\lambda_m$ fed back from the brag grating 119. Accordingly, it is possible to control the wavelengths of the downstream optical signals to be identical to the pass band wavelength of the waveguide grating routers 112 and 114 by adjusting the wavelengths $\lambda_{17} \sim \lambda_{32}$ of the downstream optical signals as much as the fluctuation of the wavelength of the waveguide grating routers 112 and 114. The downstream optical signals tuned with the pass band wavelength of the waveguide grating routers 112 and 114 are transmitted from the OLT 100 to the RN 110 via the downstream channel optical fiber 102, and are split by the discrete wavelengths $\lambda_{17}, \lambda_{18}, \ldots$ through the use of the waveguide grating routers 112 and 114 in the RN 110. Thereafter, any one of the optical signals is routed to its corresponding ONU 130 via the optical fiber 120 and is detected through the photo detector 134.

Figure 3:
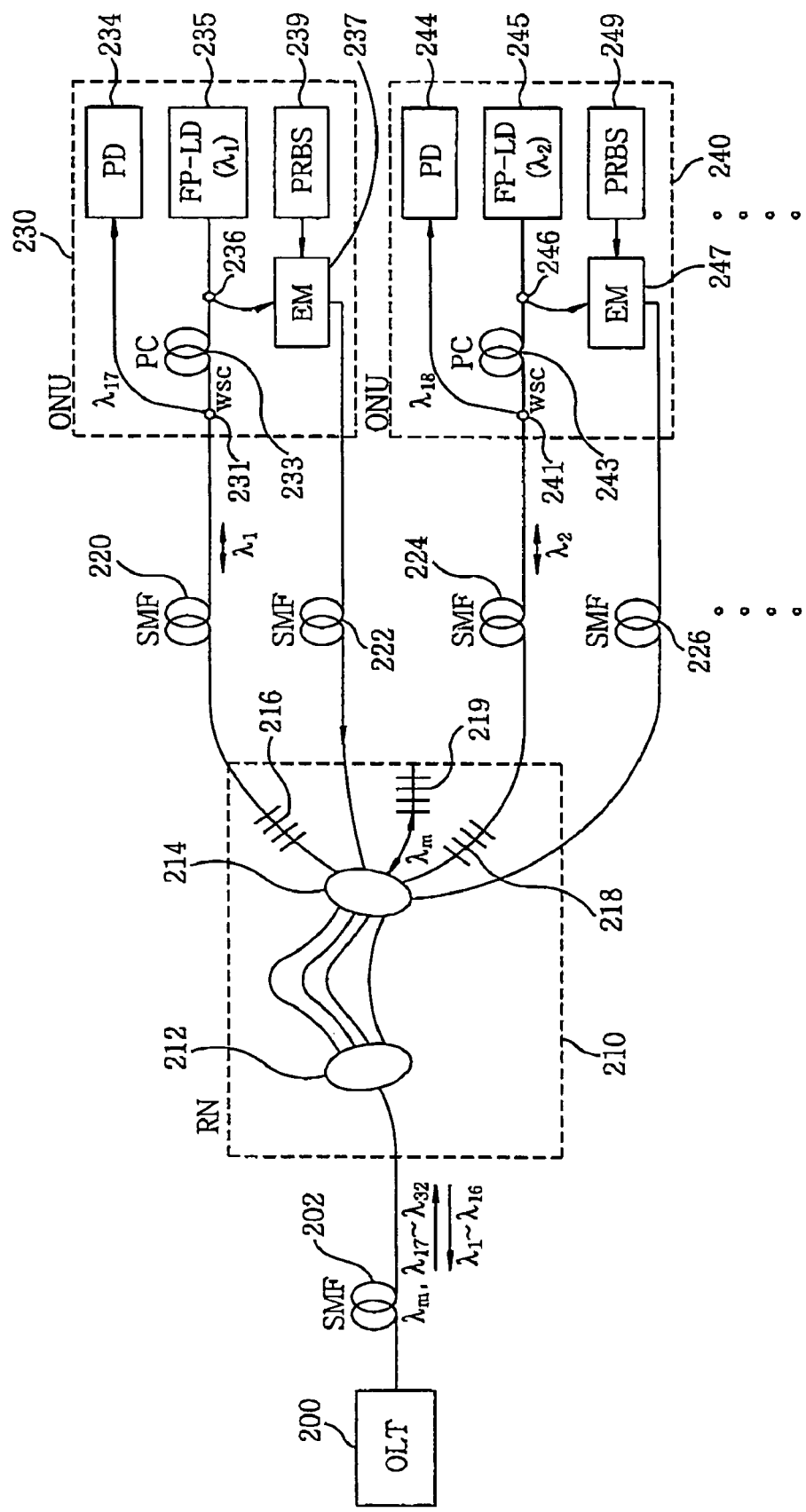
FIG. 3 is a block diagram of a wavelength division multiplexed-passive optical subscriber network (WDM-PON) employing a self-injection locked Fabry-Perot laser diode in accordance with a second preferred embodiment of the present invention.

FIG. 3 is a block diagram of the WDM-PON in accordance with a second preferred embodiment of the present invention. In this regard, the WDM-PON shown in FIG. 3 is substantially identical to that shown in FIG. 2, except the inclusion of a plurality of ONUs, only two 230 and 240 of them are shown in FIG. 3. Therefore, the detailed descriptions of the identical components will be omitted.

As shown in FIG. 3, the WDM-PON in accordance with the preferred embodiment of the present invention includes an OLT 200, a RN 210 and a plurality of the ONUs 230, 240. Further, connected between the respective base stations (from the OLT to the RN, and from the RN to the ONUs) are single mode optical fibers (SMFS) 202, 220, 222, 224 and 226.

The OLT 200 includes a plurality of laser diodes (not shown), and provides optical signals of different wavelengths for downstream service to the RN 210.

The RN 210 includes a waveguide grating router for performing a wavelength distribution function. As in the first preferred embodiment, also in the second preferred embodiment, there has been shown and described the waveguide grating router composed of a first waveguide grating router 212 coupled to the OLT 200 and a second waveguide grating router 214 coupled to the ONUs 230 and 240. However, it should be understood that this is just for functionally explaining functions of multiplexing and demultiplexing thereof, and that the waveguide grating router is substantially composed of a single component.

Coupled to the second waveguide grating router 214 are a first Bragg grating 216 connected to the optical fiber 220 and a second Bragg grating 218 connected to the optical fiber 224. As in the preferred embodiment shown in FIG. 2, the first and the second Bragg grating 216 and 218 reflect back an optical signal of a predetermined wavelength, respectively. The Bragg gratings 216 and 218 are made of silica materials identical to the waveguide grating routers 212 and 214. Accordingly, the central wavelength of the Bragg gratings 216 and 218, and the pass band wavelength of the waveguide grating routers 212 and 214 are together changed depending on a temperature variation. The Bragg gratings 216 and 218 can be integrally formed as one unit by directly inscribing using a laser and an etching method.

The ONUs 230 and 240 include wavelength selective couplers (WSCs) 231 and 241, optical power couplers 236 and 246, polarization controllers (PCs) 233 and 243, photo detectors (PDs) 234 and 244, Fabry-Ferot laser diodes (FP-LDs) 235 and 245 and external modulators (EMs) 237 and 247, respectively. Reference numerals 239 and 249 represent pseudo-random binary sequences (PBRS).

In the WDM-PON in accordance with the second preferred embodiment of the present invention, in order to transmit upstream optical signals from any one, e.g, a first ONU 230, of the ONUs to the OLT 200, multi channel wavelengths, e.g., $\lambda_1 \sim \lambda_{16}$, are oscillated in the Fabry-Perot laser diode 235 of the first ONO 230, and the optical signals of the oscillated wavelengths $\lambda_1 \sim \lambda_{16}$ are transmitted to the RN 210 via the optical fiber 220. The first Bragg grating 216 in the RN 210 reflects an optical signal of a predetermined wavelength, e.g., a wavelength $\lambda_1$ among the multiple wavelengths $\lambda_1 \sim \lambda_{16}$ of the first optical signals to be fed back to the first ONU 230 via the optical fiber 220. The optical signal of wavelength $\lambda_1$ fed back to the ONU 230 makes the Fabry-Perot laser diode 235 in the ONU 230 to be self-injection locked. The self-injection locked Fabry-Perot laser diode 235 is tuned to the feedback optical signal of wavelength $\lambda_1$ to oscillate self-injection locked wavelength $\lambda_1$, which is then transmitted to the modulator 237 via the optical power coupler 236. The modulator 237 modulates the optical signal of wavelength $\lambda_1$ with the pseudo-random binary sequence 239, and transmits the modulated optical signal of wavelength $\lambda_1$ to the RN 210 via the upstream channel optical fiber 222. The upstream optical signal transmitted to RN 210 passes the waveguide grating routers 212 and 214 to be transmitted to the OLT 200 via the optical fiber 202 at the side of the OLT 220.

Similarly, discrete wavelengths (for example, $\lambda_1 \sim \lambda_{16}$) are oscillated in a second Fabry-Perot laser diode 245 in the second ONU 240, and the optical signals of the oscillated wavelengths $\lambda_1 \sim \lambda_{16}$ are transmitted to the RN 210 via the optical fiber 224. The second Bragg grating 218 in the RN 210 reflects back the optical signal of predetermined wavelength $\lambda_2$ among the optical signals of the wavelengths $\lambda_1 \sim \lambda_{16}$ to be fed back to the ONU 240 via the optical fiber 220. Then, the optical signal of the wavelength $\lambda_2$ fed back to the ONU 240 makes the Fabry-Perot laser diode 245 to be self-injection locked. The self-injection locked Fabry-Perot laser diode 245 oscillates the optical signal tuned to the feedback wavelength $\lambda_2$, which is then provided to the external modulator 247 via the optical power coupler 246. The external modulator 247 modulates the optical signal of the wavelength $\lambda_2$ while adding the pseudo-random binary sequence 249 thereto, and then, transmits the modulated optical signal to the RN 210 via the upstream channel optical fiber 226. The upstream optical signal transmitted to the RN 210 passes the waveguide grating routers 212 and 214 to be transmitted to the OLT 200 via the optical fiber 202 at the side of the OLT200.

Meanwhile, similarly as in the first preferred embodiment described above, when transmitting the downstream optical signals from the OLT200 to the respective ONUs 230 and 240, the configuration for monitoring temperature variation at the waveguide grating routers 212 and 214 in the RN 210 includes the Bragg grating 219 coupled to the second waveguide grating router 214 of the RN 210. The Bragg grating 219 is made of silica identical with the waveguide grating routers 212 and 214, and can be integrally formed in the second waveguide grating router 214 as one unit by directly inscribing using a laser and an etching method. Further, the wavelength for monitoring the temperature variation of the waveguide grating routers 212 and 214 is selected as a predetermined wavelength, e.g., $\lambda_m$, other than $\lambda_{17} \sim \lambda_{32}$ of the downstream optical signals.

The Bragg grating 219 reflects back the optical signal of the monitoring wavelength $\lambda_m$ to the OLT 200. In case where the temperature at the RN 210 is changed, a central wavelength of the Bragg grating 219 is also changed accordingly together with the pass band wavelength of the waveguide grating routers 212 and 214. For this reason, the monitoring wavelength $\lambda_m$ is tuned to the changed pass band wavelength of the waveguide grating router 212 and 214. Therefore, information on the temperature variation of the waveguide grating routers 212 and 214 and the fluctuation of the pass band wavelength is reflected in the monitoring wavelength $\lambda_m$. Accordingly, it is possible to control the wavelengths of the downstream optical signals can be controlled to be identical with the pass band wavelength of the waveguide grating routers 212 and 214 by adjusting the wavelength of the downstream optical signal as much as the fluctuation of the pass wavelength of the waveguide grating routers 212 and 214.

The downstream optical signals tuned to the pass band wavelength of the waveguide grating routers 212 and 214 are transmitted to the RN 210 via the downstream channel optical fiber 202, and are split according to the wavelengths ($\lambda_{17}$, $\lambda_{18}$, ...) by the waveguide grating routers 212 and 214 to be transmitted to the corresponding ONUs 230 and 240 via the corresponding optical fibers 220 and 224, respectively. Then, the optical signals are detected through the photo detectors 234 and 244, respectively.

Figure 4A:
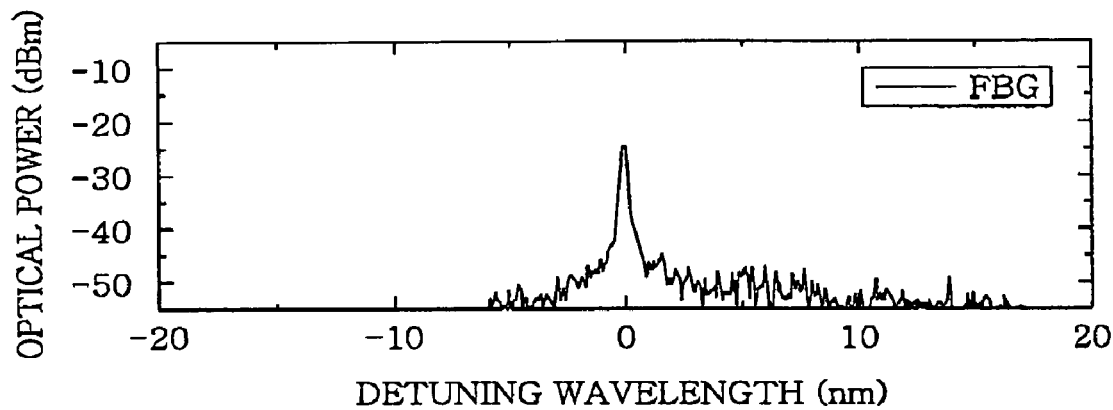
FIGS. 4A to 4C show a graph of a Bragg grating spectrum, a graph of an optical spectrum of a self-injection locked Fabry-Ferot laser diode and a graph showing a side mode suppression ratio depending on a distance between an ONU and a RN, respectively.
Figure 4B:
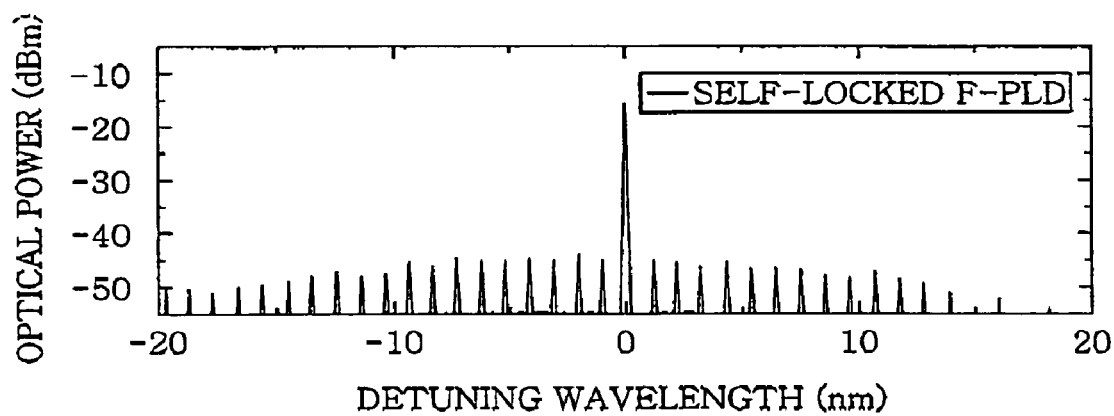
Figure 4C:
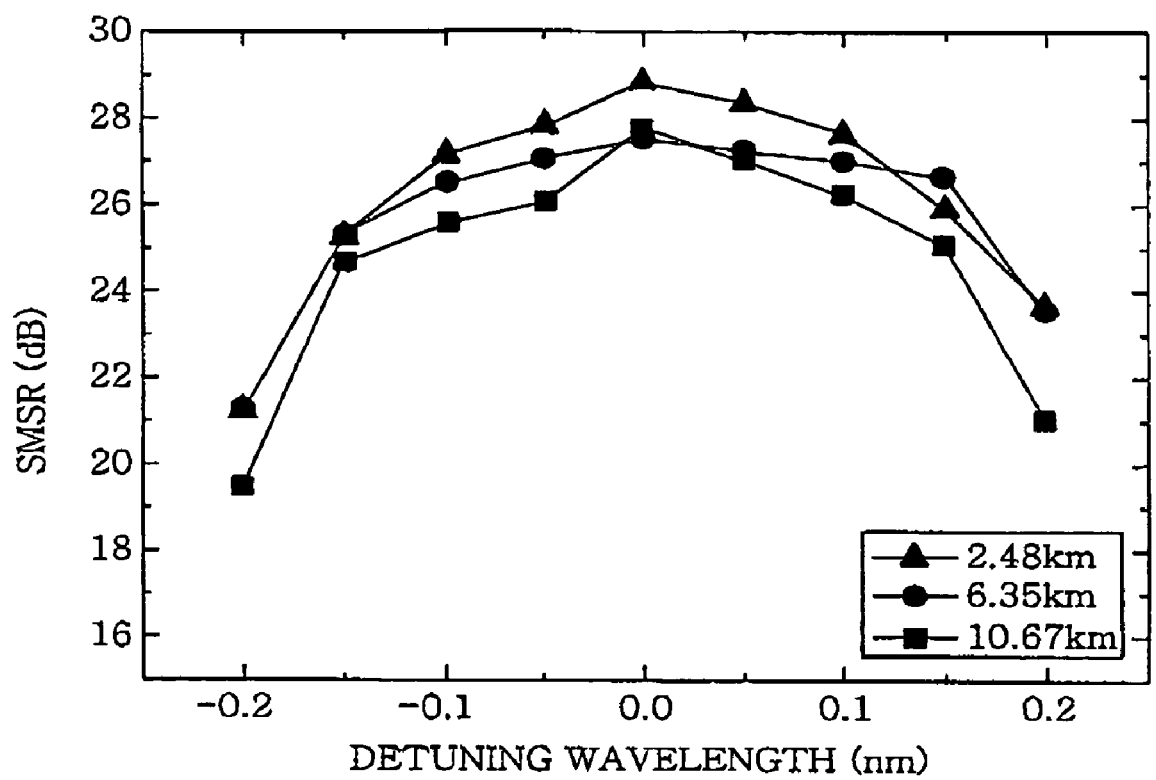

FIGS. 4A to 4C are graphs respectively showing spectrum of the Bragg grating, optical spectrum of the self-injection locked Fabry-Perot laser diode and an adjacent mode control rate according to a distance between the ONU and the RN in the WDM-PON in accordance with the present invention. In particular, FIG. 4C is a graph of measuring a side mode suppression ratio (SMSR) in each distance while changing the temperature at the waveguide grating router by 0.5° C. from 20° C. to 50° C., wherein the distance between the ONU and the waveguide grating router in the RN is set to be 2.48 km, 6.35 km and 10.67 km in the WDM-PON in accordance with the present invention.

It is known from FIGS. 4A and 4B that, although the distance between the ONU and the RN is changed in the WOM-PON of the present invention, the self-injection locked wavelength of the Fabry-Perot laser diode in the ONU is identical with the single wavelength allotted to the Bragg grating in the RN.

Figure 5:
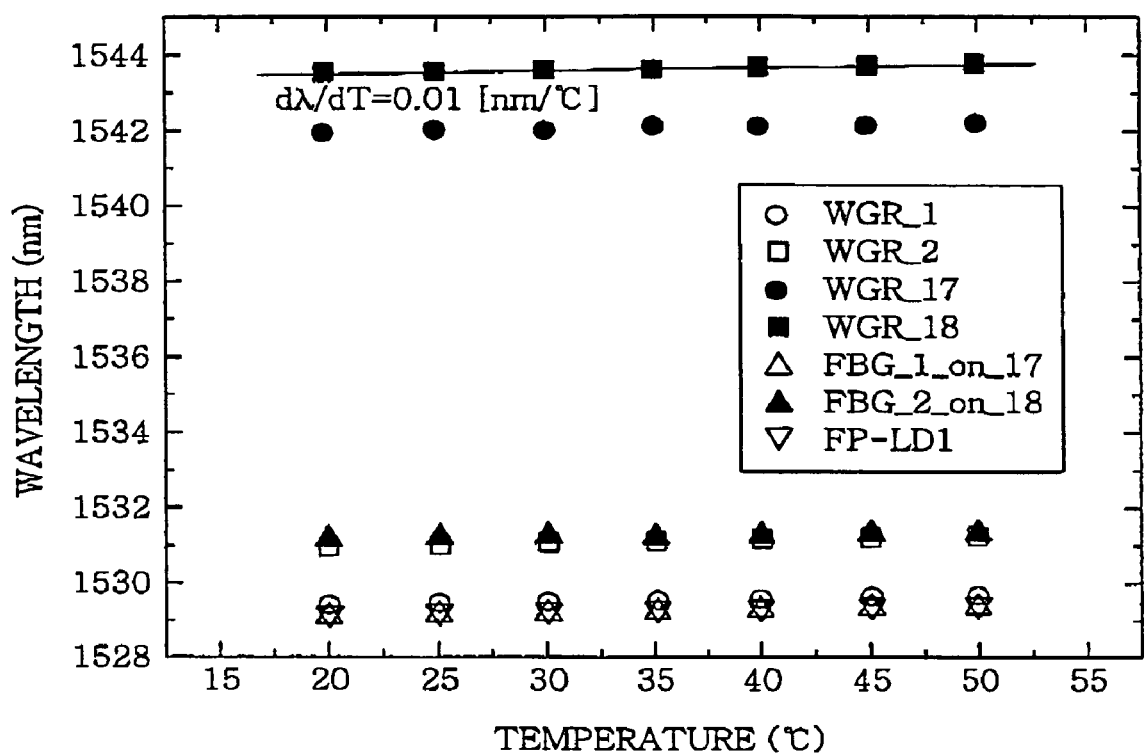
FIG. 5 is a graph showing variations a of pass band wavelengths of a waveguide grating router depending on a temperature variation, a temperature characteristic diagram of a Bragg grating and a wavelength variation diagram corresponding with a temperature variation of a self-injection locked Bragg grating in a Fabry-Perot laser diode in the WDM-PON in accordance with the present invention.

FIG. 5 is a graph showing a variation of each pass band wavelength of the waveguide grating router according to temperature, the temperature variation of the Bragg grating and the wavelength variation according to the temperature variation of the self-injection locked Fabry-Perot laser diode in the WDM-PON in accordance with the present invention. In FIG. 5, a circle (○) represents a waveguide grating router (WGR_1) having a pass wavelength $\lambda_1$; a square (□) stands for a waveguide grating router (WGR_2) having a pass wavelength $\lambda_2$; a black circle (●) indicates a waveguide grating router (WGR_17) having a pass wavelength $\lambda_{17}$; a black square (■) shows a waveguide grating router (WGR_18) having a pass wavelength $\lambda_{18}$; a triangle (Δ) represents a Bragg grating (FBG_1 on_17) associated with the waveguide grating router (WGR_17); a black triangle (▲) stands for a Bragg grating (FBG_2 on_18) associated with the waveguide grating router (WGR_18); and an opposite triangle (∇) shows a Fabry-Perot laser diode (FP-LD1) tuned to the pass wavelength $\lambda_{17}$. As shown in FIG. 5, it is known that the temperatures of the Bragg gratings FBG_1 on_17 and FBG_2 on_18 having wavelength variation gradients identical with the wavelength variations depending on the temperature variations of the waveguide grating routers WGR_1, WGR_2, WGR_17 and WGR_18 in the RN are identically changed. Moreover, the wavelength variation according to the temperature of the Fabry-Perot laser diode FP-LD1 is identical to the wavelength variation according to the temperature variation of the fixed Bragg grating FBG_1_on_17).

Figure 6:
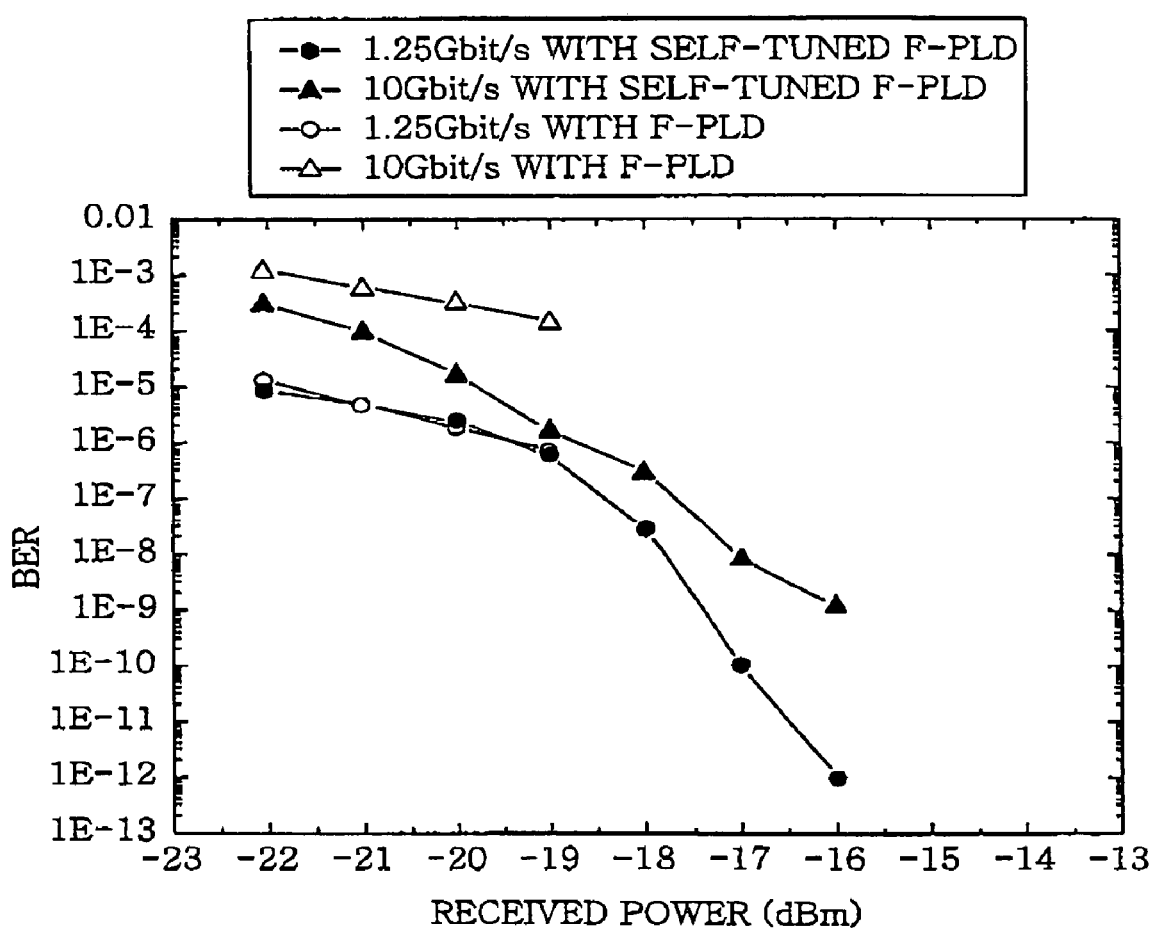
FIG. 6 is a graph showing a measured bit error rate depending on a modulated speed of a self-injection locked Fabry-Perot laser diode in the WDM-PON in accordance with the present invention.

FIG. 6 is a graph showing a measured bit error rate when modulating the upstream signal of a predetermined wavelength oscillated in the self-injection locked Fabry-Perot laser diode into 10 Gbit/s and 1.25 Gbit/s in the WDM-PON in accordance with the present invention. As shown in FIG. 6, the self-injection locked Fabry-Perot laser diodes (Δ, ▲) of the ONU generates only a locked wavelength of a narrow line width and, therefore, shows more improved bit error rate efficiency than that of ordinary Fabry-Perot laser diodes (○, ●).

Accordingly, in the WDM-PON in accordance with the present invention, the low-priced Fabry-Perot laser diode is used in the ONU, and the Fabry-Perot laser diode is oscillated in a self-injection locked state by a single wavelength reflected from the Bragg grating coupled to the waveguide grating router in the RN, thereby generating the upstream optical signal of a single wavelength having a wavelength characteristic identical to the grating in the RN.

Furthermore, in the present invention, by transmitting a predetermined monitoring wavelength from the OLT to the RN and periodically monitoring the variation of the wavelength reflected from the Bragg grating coupled to the waveguide grating router in the RN, the wavelength of the downstream signals can be controlled to be identical to the pass band wavelength of the waveguide grating router.

While the invention has been shown and described with respect to the preferred embodiments, it will be understood by those skilled in the art that various changes and modifications may be made without departing from the spirit and scope of the invention as defined in the following claims.

What is claimed is:

1. A wavelength division multiplexed-passive optical network comprising:
    an optical line terminal for generating downstream optical signals of discrete wavelengths and receiving upstream optical signals of discrete wavelengths;
    a remote node, coupled to the optical line terminal via a first optical fiber, including a wavelength division unit configured to reflect a given wavelength, the wavelength division unit including:
        a waveguide grating router coupled at least to a second optical fiber, and
        a plurality of Bragg gratings provided between the waveguide grating router and the second optical fiber or integrally formed in the waveguide grating router; and
    a plurality of optical network units coupled to the remote node via the second optical fiber, each optical network unit being associated with one of the Bragg gratings and including
        an optical source configured to oscillate in a multimode, the optical source being configured to be self injection locked to oscillate in a single mode selected from the multimode when the optical source receives the given wavelength reflected from the remote node,
        a modulator to modulate an upstream optical signal in the single mode output by the optical source for transmission to the remote node via a third optical fiber that is different than the second optical fiber.

2. The wavelength division multiplexed-passive optical network of claim 1, wherein a central wavelength of each Bragg grating and a pass band wavelength of the waveguide grating router fluctuate depending on temperature variation,
    wherein each Bragg grating is configured to reflect the given wavelength that can be any one of wavelengths associated with the multimode of the optical source, so that the optical source is self-injection locked to generate the upstream optical signal tuned to the given wavelength.

3. The wavelength division multiplexed-passive optical network of claim 1, wherein the Bragg grating is integrally formed in the waveguide grating router.

4. The wavelength division multiplexed-passive optical network of claim 1, wherein the waveguide grating router and the Bragg grating are made of silica materials.

5. The wavelength division multiplexed-passive optical network of claim 2, wherein the waveguide grating router and the Bragg grating are made of silica.

6. The wavelength division multiplexed-passive optical network of claim 3, wherein the waveguide grating router and the Bragg grating are made of silica materials.

7. The wavelength division multiplexed-passive optical network of claim 3, wherein the Bragg grating is integrally formed in the waveguide grating router by a laser or an etching method.

8. The wavelength division multiplexed-passive optical network of claim 1, wherein the optical source includes a Fabry-Perot laser diode.

9. A wavelength division multiplexed-passive optical network comprising:
    an optical line terminal for generating downstream optical signals of discrete wavelengths and receiving upstream optical signals of discrete wavelengths;
    a plurality of optical network units, each optical network unit including:
        an optical source configured to oscillate in a multimode and be self-injection locked to oscillate in a single mode when the optical network unit receives a reflected wavelength, and
        a modulator to modulate an upstream optical signal tuned to the reflected wavelength output by the optical source before the upstream optical signal is transmitted to the remote node;

a remote node coupled to the optical line terminal via a first optical fiber and the plurality of optical network units via a second optical fiber, the remote node including a wavelength division unit, wherein the wavelength division unit includes:
  a waveguide grating router coupled to at least the second optical fiber, and
  a plurality of Bragg gratings provided between the waveguide grating router and the second optical fiber or integrally formed in the waveguide grating router, each Bragg grating being associated with one of the optical network units.

10. The wavelength division multiplexed-passive optical network of claim 9, wherein a central wavelength of each Bragg grating and a pass band wavelength of the waveguide grating router fluctuate depending on temperature variation, and
  wherein each Bragg grating is configured to reflect the given wavelength that can be any one of wavelengths associated with the multimode of the optical source, so that the optical source is self injection locked to generate the upstream optical signal tuned to the given wavelength,
  wherein the modulated upstream optical signal is transmitted to the remote node via a third optical fiber that is different than the second optical fiber.

* * * * *